United States Patent [19]

Baldwin

[11] 3,922,669

[45] Nov. 25, 1975

[54] TELEVISION SYSTEMS

[75] Inventor: John Lewis Edwin Baldwin, Croydon, England

[73] Assignee: Independent Broadcasting Authority, London, England

[22] Filed: Aug. 22, 1973

[21] Appl. No.: 390,375

[30] Foreign Application Priority Data

Aug. 24, 1972 United Kingdom .............. 39606/72
Aug. 24, 1972 United Kingdom .............. 39605/72

[52] U.S. Cl. .......... 340/347 DD; 307/209; 325/384; 128/DIG. 3

[51] Int. Cl.² ............................................ H04L 3/02

[58] Field of Search ........... 235/154; 307/209, 141, 307/221; 340/347 DF, 347 PP; 178/68, DIG. 3; 325/38 A

[56] References Cited

UNITED STATES PATENTS

| | | | |
|---|---|---|---|
| 2,763,854 | 9/1956 | Oliwa | 340/316 |
| 3,130,324 | 4/1964 | Swallow | 307/88.5 |
| 3,628,000 | 12/1971 | Weiss | 235/176 |
| 3,761,818 | 9/1973 | Tazaki et al. | 325/38 A |

*Primary Examiner*—Malcolm A. Morrison
*Assistant Examiner*—Vincent J. Sunderdick
*Attorney, Agent, or Firm*—A. W. Breiner

[57] ABSTRACT

An input signal having a limited set of possible values is compared with a reference signal having a cycle in which values corresponding with the said possible values are repeated in sequence. Output signals are produced when the values of the input signal and the reference signal correspond and their phase relationship with the reference signal represents the values of the input signal. The outputs may be operable to reverse the condition of a binary output so that the timings of the reversals represent magnitudes.

Channel economy is obtainable by having more values in the reference signal cycle than the number of possible values in the input signal. It is also obtainable by suppressing the outputs corresponding with pre-determined changes of the input.

When applied to digital video recording, the system gives satisfactory results with only a small number of heads, e.g. 4 heads in use at any instant for a 625-line video signal with 2 inch recording tape at 15 inches per second.

7 Claims, 12 Drawing Figures

TELEVISION SYSTEMS

SUMMARY OF THE INVENTION

The coding of information in the form of digital signals or other signals of the kind which have a limited set of possible magnitudes, two in the especially important case of binary signals, is attractive for many purposes and is becoming of increasing interest in the processing of video signals.

In accordance with the present invention, there is provided apparatus for converting a digital input signal or other input signal of the kind which has a limited set of possible values which comprises an input for a reference signal having a cycle in which values corresponding with the possible values of the input signal and at least one additional value are repeated in sequence, and a comparator responsive to produce an output when the value of the reference signal corresponds with the value of the input signal, so that outputs are obtained whose relationship to the phase of the reference signal represent the value of the input signal. Advantageously the outputs are operable to reverse the condition of a binary output so that the timings of the reversals represent the values of the input signal.

Further apparatus, provided in accordance with the invention for recovering the input signal from outputs obtainable as aforesaid, comprises means adapted by response to the outputs or by response to timing apparatus to generate the appropriate reference signal and regenerating device operable to sample the values of the reference signal at times governed by the outputs.

The apparatus for generating the reference signal is conveniently operable to generate the reference signal with one value more than the number of possible values of the input signal. Thus for binary digital input signals, the means for generating the reference signal preferably provides a cycle which comprises three values. One of the values of the reference signal may be zero.

Using a reference signal having the same number of values as the number of possible values of the input, can, on statistical grounds, be expected to give no output at all over significant periods in practical cases. This necessitates making special provision for synchronisation in order to recover the input signal reliably, e.g. by having a clock circuit common to the comparator and the equipment by which the input is to be recovered. By using a reference signal having one or more values in excess of the number possible in the input signal, there can be no prolonged zero output condition and simple synchronisation arrangements, responsive to the received signals themselves, may be incorporated in the recovery equipment. Satisfactory results may indeed be obtained if the outputs are recorded on tape or other recording medium. An important further effect of the excess value or values of the reference signal is to increase the minimum time between the output transitions with consequent economy in a transmission or recording channel therefor.

It is possible also, when the reference signal has more values than the possible values of the input signal, to obtain channel economy by omitting certain outputs corresponding with pre-determined changes of the value of the input signal, treating the absence of signals at the recovery point as indicating the pre-determined changes, and inserting them locally. The simple case of an input signal having the four possible values of 0 to 3 inclusive, a reference signal having a cycle of five value, and the omission of any output when the input signal has a zero level immediately following a three-level, will be referred to hereinafter.

The principles of the invention are applicable using analog input signals and an analog reference having a rapid rise-time between the possible levels. Indeed, certain of the accompanying drawings show stepped analog signals for simplicity of illustration. The most important application of the principles is to digitised signals. With binary digits, a two bit word (perhaps received on two wires) can represent any one of the four levels 00, 01, 10 and 11. More than four levels can be represented by having words of more than two bits. It is a simple matter to generate an output when the numerical values of the input and reference signals correspond — or for that matter differ by a pre-determined amount.

The invention is of special value when applied to the recording of television signals on video tape. For a 625-line television signal using eight bits per word, the required bit rate is about 106 megabits per second. Such a high bit rate would appear difficult to achieve in recording, but it is nevertheless possible using apparatus according to the invention.

A data rate of 106 Mb/s is too high for recording a 625-line signal on a single track. It thus appears desirable to divide the data rate between a number of heads; a natural first choice would be eight tracks produced by eight heads each operating at 13.3 Mb/s. Using signals obtained from apparatus according to the present invention, in which the data is represented by the times at which changes of sign occur, satisfactory results are obtainable using only four tracks.

In the disclosure which follows, reference is made to the accompanying drawings for purposes of illustration.

Figure 1:
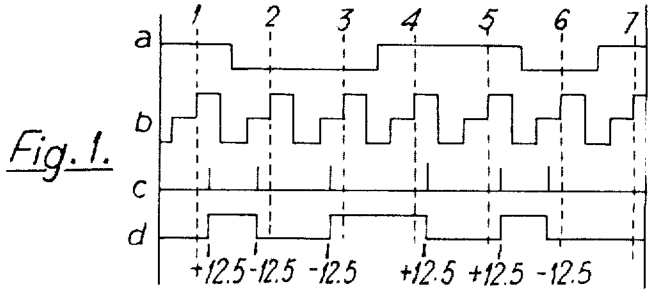
FIGS. 1 to 4 show diagrammatically the manner in which original inputs are compared with cyclic reference signals and processed to give signals for transmission and the manner in which the original inputs are recovered from the transmission signals.

The application of the present invention to give a favourable binary coding offering useful advantages is shown diagramatically in FIG. 1. The input data (a) is shown at the top. When identity occurs between the states of the input data (a) and the level reference (b) — shown on the next line — a pulse is produced (c)

which changes the sign of the recorded signal (d) as shown in the fourth line. The replayed signal (e) from the tape is shown in idealised form at the top of FIG. 2 which outlines the replay processing. The signal is differentiated and full-wave rectified, so providing a zero-crossing pulse (f) whenever a change of sign occurs. These pulses are used to energise a resonant circuit at a multiple of the required clock frequency, and this can readily be divided to yield the replay level reference (h) shown on the fourth line. There remains an ambiguity to be resolved, and this can be done when a known bit is received. The zero-crossing pulses are used to sample the level reference (h) giving the intermediate data (j) and finally this is sampled just after the time of the negative edge of the level reference (h) giving the output data (k) signal, which will be seen to be a duplicate of the input data (a) of FIG. 1.

For a 625-line video signal the appropriate duration for each word is just over 75 nanoseconds, so that — assuming that one bit per word is recorded on each track — the times indicated in FIG. 1 will be correct. The time of occurrence of all zero crossings of the recorded signal will be either 12.5 nS early or 12.5 nS late on the mean timing (shown by dashed lines). The maximum timing error that can be tolerated between the zerocrossing pulses and the level reference signal must therefore always be kept to less than 12.5 nS peak. It should be remembered that any drift of timing of the zero-crossing pulses will be followed by compensating timing changes of the level reference signal so that the predominant error will be the fast drift of timing of the zero-crossings.

Measurements indicate that such fast changes of timing are likely to amount to only 0.5 nS peak; there is thus a safety margin of about 25:1. The conditions under which these measurements were made were a head-to-tape speed of 1500 in/sec. (38.1 M/s) and a track width of 0.01 in (0.254 mm).

It has been assumed so far that there is binary coding on each track, but there is no reason why quaternary or octal codes should not be considered.

Figure 2:
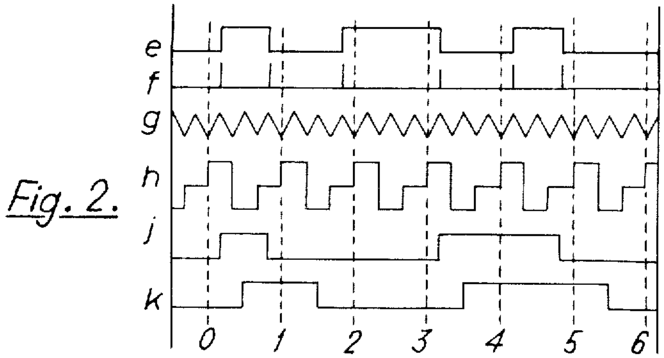
Figure 3:
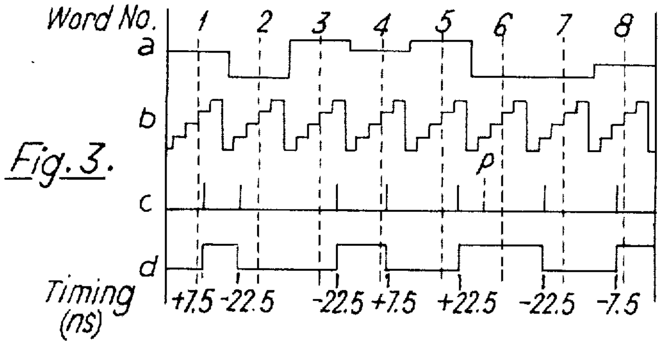
Figure 4:
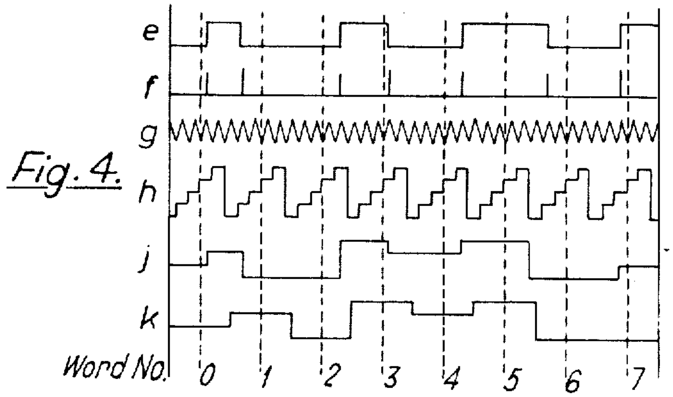

FIGS. 3 and 4 illustrate the signals that arise for a quaternary code. The explanation already given in respect of FIGS. 1 and 2 is equally relevant to this case and will not be repeated. The only significant difference is the use made of the redundancy which exists in the system; this is used whenever a zero immediately follows a three, but not the converse. When this condition arises, the zero-crossing is omitted (dashed pulse P). This is identified during replay by the absence of any zero crossing through a complete cycle of the level reference (h); the zero is then re-inserted. It would be dangerous to use this technique for all zeros, since a long string of them could result in the level reference signal becoming unlocked. However, by making use of this redundancy in the signal the duration of the minimum half-cycle of the recorded signal can be increased by 50 percent; this may permit the adoption of a head-to-tape speed of only two-thirds of what would otherwise be necessary.

For this particular quaternary system, using a scale of four, a timing accuracy of better than 7.5 nS is required. If the track width be reduced from 0.01 to 0.0025 in, it is possible that the timing error could increase by a factor of 2:1, but this would still be less than about 1 nS peak.

With this narrow track width, it would appear practical to use an octal system, that is a scale of eight, and this would require a timing accuracy of better than 3.125 nS. Even this would yield a safety margin of 3:1 and this would appear adequate.

It is desirable that protection should be provided against drop-outs. An effective technique is to use several parity bits in order to protect the more significant bits of each digital word, although it is also essential to arrange that the probability of simultaneous drop-outs of information is low; for example, to ensure that two heads would not be affected simultaneously by a longitudinal scratch on the tape.

The following description of a digital video recording apparatus which is the subject of Application Ser. No. 390,376 is given to illustrate a practical application of the present invention For the recording of words at a high bit rate, e.g. as with video signals, it is impracticable to record in tracks extending longitudinally along a magnetic tape. The apparatus when required for such purposes preferably has the recording and/or reproducing heads mounted by a disc or other turret which is rotatable with respect to the direction of longitural movement of the medium so that the relative motion of the heads relative to the medium has a transverse component and the heads are carried into and out of recording or reproducing relationship with the medium by rotation of the turret, and the number and positioning of said heads about the turret is greater than the number of heads in said set, and the heads in said set at a particular time are heads mounted by the turret which are in recording or reproducing relationship with the medium. Advantageously the number of heads mounted by the turret is such that the number of heads in recording or reproducing relationship with the medium is at times greater than the number of heads in said set. This arrangement provides time for synchronisation before the additional head or heads is brought into normal operation (in place of a head which is to be rotated out of recording or reproducing relationship with the tape). Suitably, the number of heads is five, spaced apart at 72° intervals around the turret.

Figure 5:
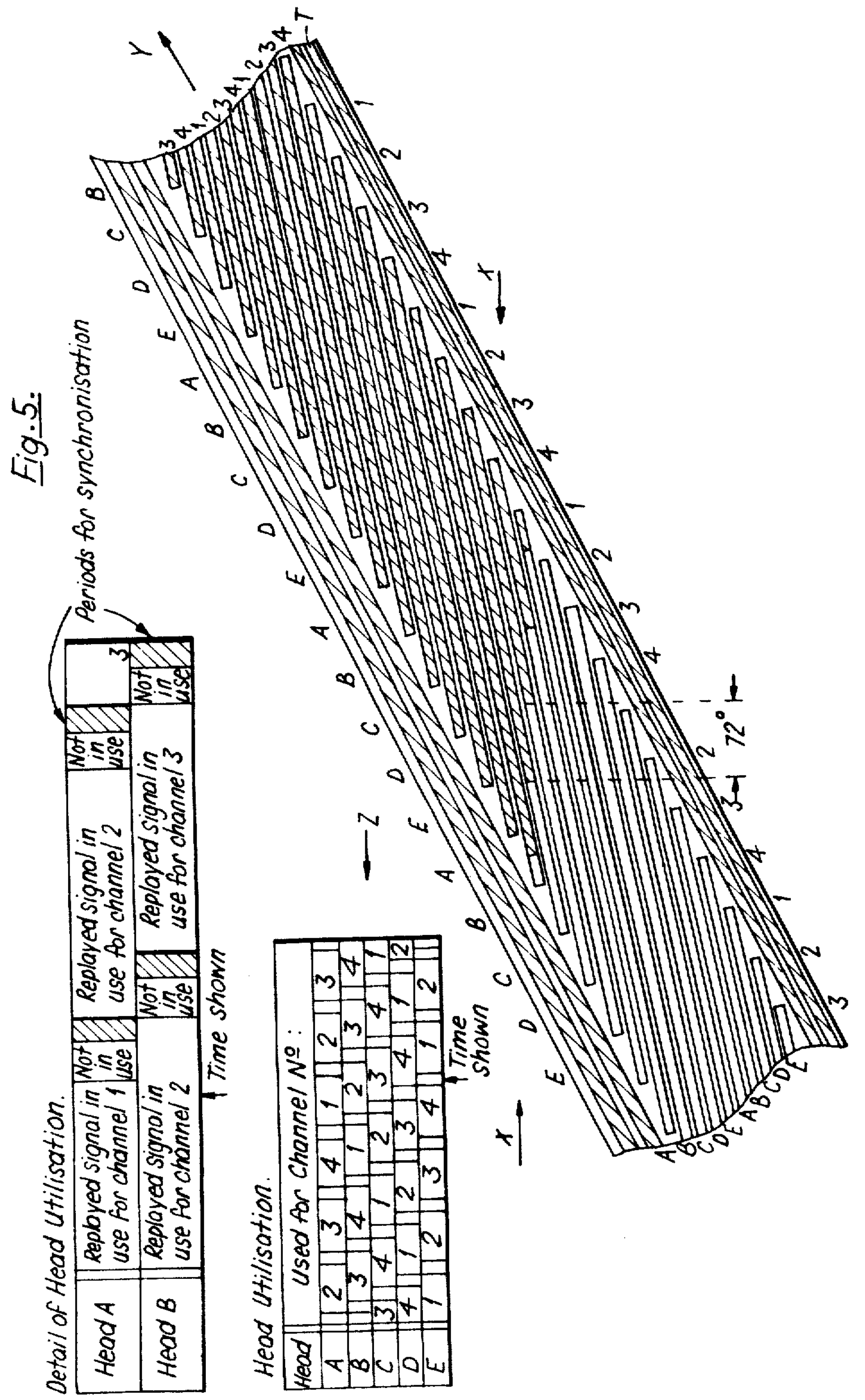
FIG. 5 shows the manner in which digital signals, processed in accordance with the invention may be recorded on magnetic tape by five recording heads A, B, C, D, and E fed from four channels.

Tape already traversed by the head is shown shaded in FIG. 5 and tape about to be traversed is shown unshaded. Arrows X show the plane of the heads, arrow Y shows the direction of travel of the tape and arrow Z shows the direction of movement of the heads.

A typical apparatus has tape handling apparatus of generally known mechanical construction. It has five heads A, B, C, D and E spaced at 72° intervals around a drum arranged to have 2 inch videorecording tape which contacts it over 288° or more so that it is contacted by at least four heads at any particular time. To minimise tracking errors the drum is made relatively small, e.g. 10 inches in circumference. The head speed is 1250 inches per second and the head to tape speed is 1265 inches per second, the rate of rotation of the drum being 125 revolutions per second. At a tape speed of 15 inches per second the centre-to-centre spacing of the tracks is 0.0048 inch (0.123 mm). The track width is 0.0025 inch (0.0635 mm) giving a guard band of 0.0023 inch (0.0584 mm). This guard band is adequate for 2 inch tape having a length of 8 inches in contact with the drum.

Figure 12:
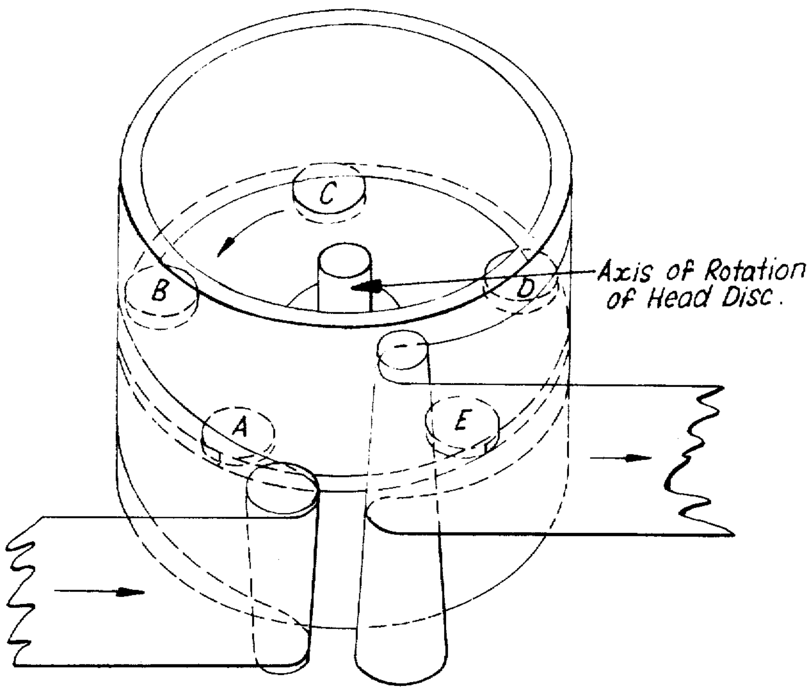
FIG. 12 shows the mechanical arrangement of the five recording heads and the recording tape.

The relationship between the heads and the tape is shown in FIGS. 5 and 12 which are generally self-explanatory, rotors with heads which are moved so that the tape is transversed diagonally being well understood. The four longitudinal tracks shown are available for purposes other than video signal recording, e.g. track may be uses as a control track for synchronising purposes.

At any time four heads are in recording or reproducing relationship with the tape. The five are switched so that they handle four channels 1, 2, 3 and 4 in the sequence shown in FIG. 5 in the table "Head Utilisation." Parts of the cycles of operation of two of the heads A and B are shown in another table in FIG. 1. As will be seen there are for each head, periods when the head is not in use for actual reproduction (or recording) of a channel. Parts of these periods are used for synchronisation purposes.

Figure 6:
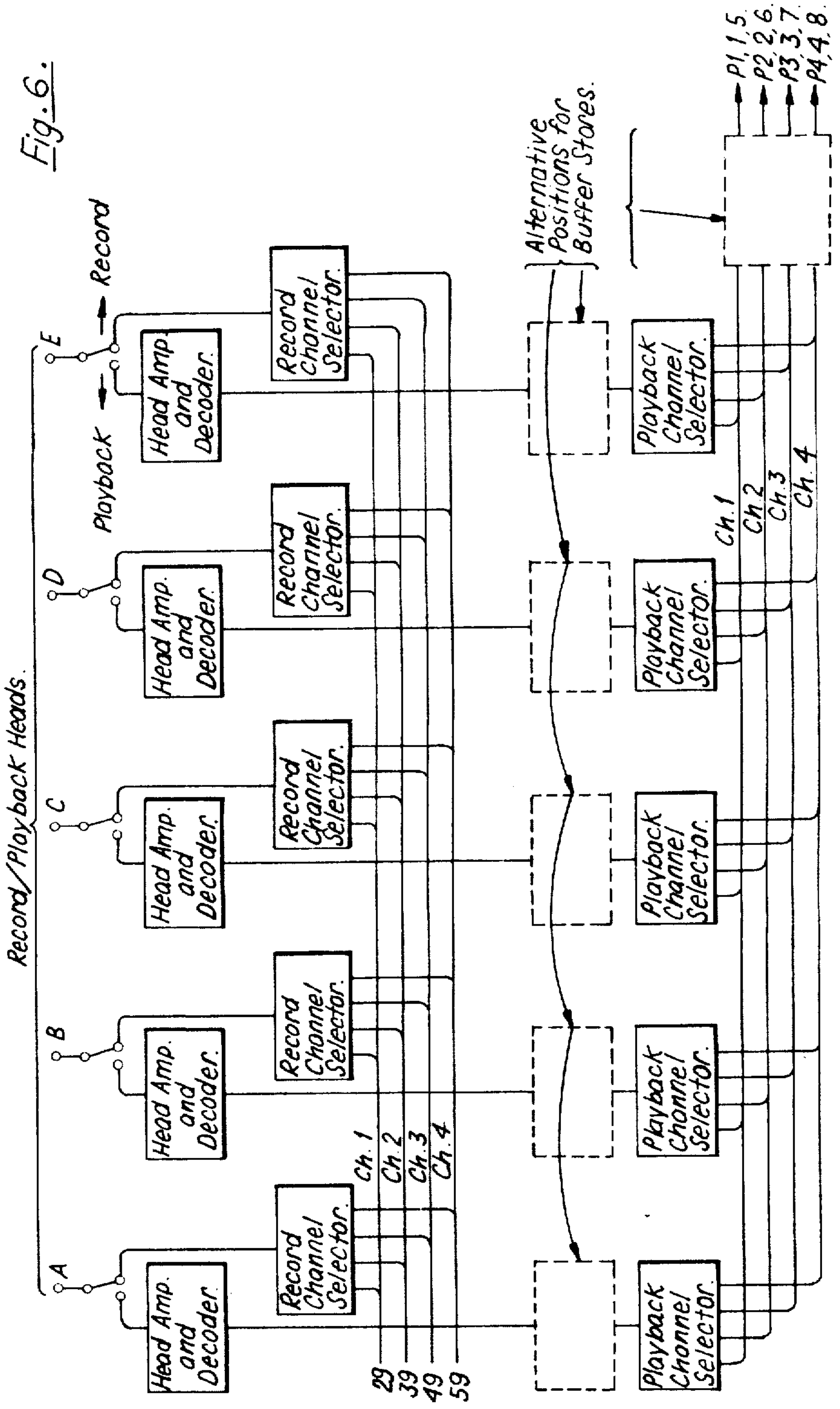
FIG. 6 shows how the four channels are routed to the five heads A, B, C, D, and E.

FIG. 6 shows how the four Record Channels Chl to Ch4 arriving at inputs 29, 39, 49 and 59 respectively are routed to the five heads A, B, C, D and E during recording and also shows how the signals recovered from the tape pass through Head Amplifiers and Decoders to Playback Channel Selectors which operate to route the signals from the appropriate head to each of the Playback Channels. The Record and the Playback Channel Selectors are controlled by means not shown to achieve the Head Utilisation given in FIG. 5. Two possible positions for buffer stores are shown. That shown at the bottom right yields a Buffer Store function at lower cost than for the alternative case of five Buffer Stores of one quarter the size shown above and to the left. However the latter would permit even larger timing inaccuracies between heads. For normal applications the buffer store position after the Playback Channel Selectors is preferred and will be assumed from hereon.

Figure 7:
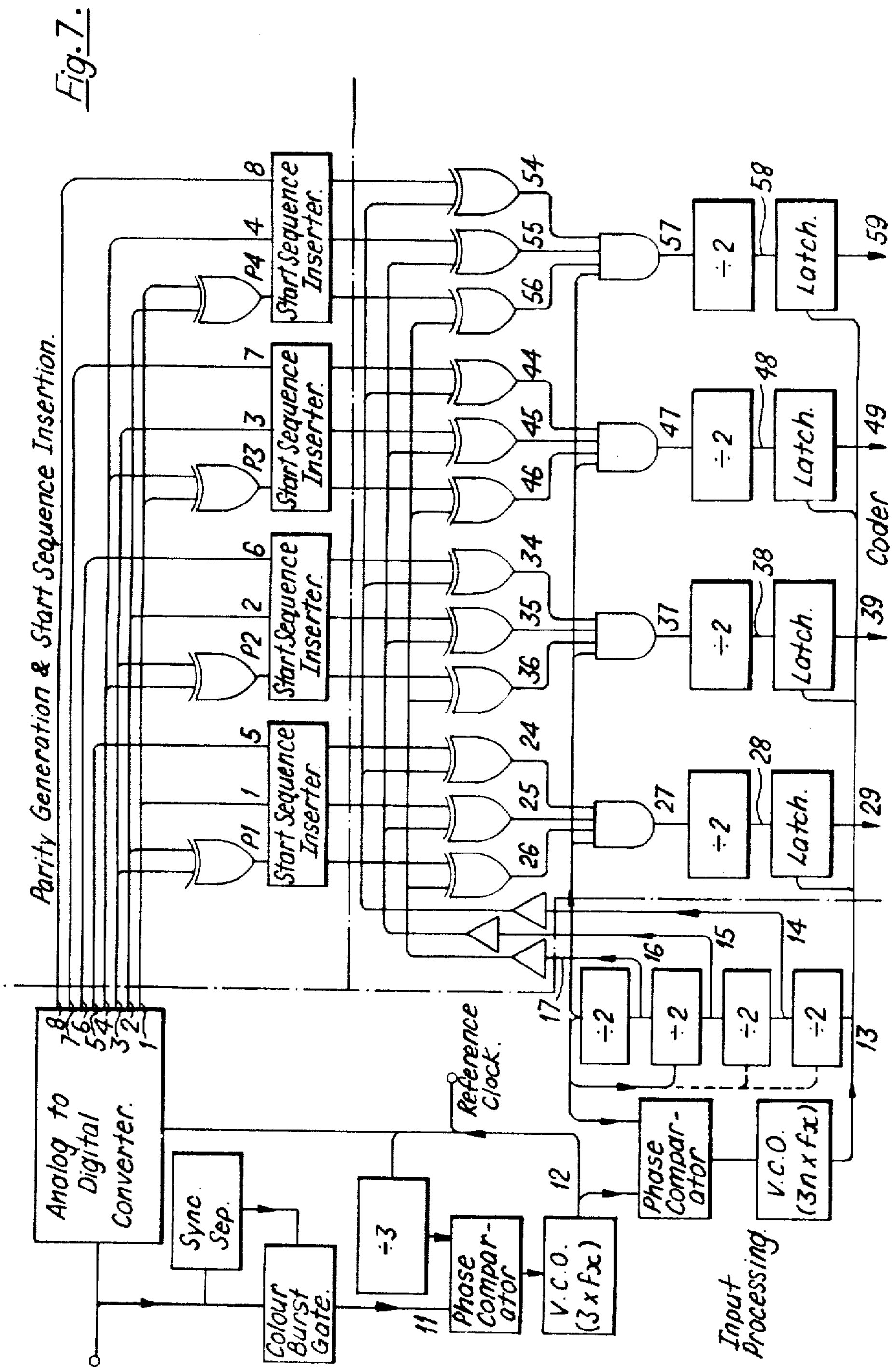
FIG. 7 shows apparatus for processing an analog input signal to give the four channel outputs 29, 39, 49, and 59.

FIG. 7 shows how an analog input signal isprocessed to give the four Record Channel outputs 29, 39, 49 and 59. The analog video signal is sampled in the Analog-to-Digital Converter and quantised to yield eight bit binary words (256 possible magnitudes). The bits of these words occur simultaneously on the eight outputs numbered 1 to 8 inclusive, 1 being the most significant and 8 the least significant. The analog input signal also passes to a sync. separator which generates a pulse which permits the colour burst (11) to pass to one input of a Phase Comparator. The output of the phase comparator controls the frequency of a Voltage Controlled Oscillator VCO whose output is divided by three to give the other input to the Phase Comparator. By this means the frequency of the oscillator is maintained at precisely three times that of the incoming subcarrier and every third cycle of the oscillator has a defined phase relationship to that of the burst. The output 12 of the oscillator, the reference clock, is used to control the sampling process in the Analog Digital Converter and also is used as a reference by a further phase comparator controlling a further voltage controlled oscillator whose output 13 is divided by n in a binary counter with resets, and feeds back to the other input of the further phase comparator. In this particular description the factor n is twelve.

Obviously for a recorder accepting a signal already in digital form, the inputs could be the eight bit words shown coming from the A/D converter and a reference clock.

The input digital data or that from the A/D converter are processed as follows. The input data corresponding to bits 2 and 3 feed an Exclusive-or Gate giving an output Parity 1 (P1) which will be low when the data on bits 2 and 3 is the same i.e. both low or both high. This may be seen from lines 2, 3 and P 1 on the waveform diagram given in FIG. 11. Under normal conditions Parity 1 and the data corresponding to bits 1 and 5 pass directly through the Start Sequence Inserter without modification and each passes to an input of three further Exclusive-or Gates with outputs 26, 25 and 24. The outputs 16, 15 and 14 of the binary counter are inverted and pass to the other inputs of these exclusive-or gates. Due to the action of these inverters, output 26 will be high when the states of 16 and P 1 are the same. Similarly output 25 and 24 are high when 1 corresponds with 15 and 5 corresponds with 14 respectively. When 17, 26, 25 and 24 are all high the output of the AND Gate goes high causing a reversal of the state of 28. The signal 17 is high for eight successive states of the divide by 12 counter and low for the remaining 4. Due to the number of gates the signal has passed through the Latch is used to retime the transitions of the output 29 to minimize the effects of propagation times.

In precisely the same way the other output signals 39, 49 and 59 are generated from their appropriate data.

The Start Sequence Inserters are used to generate a predetermined pattern of ONES and ZERO'S which need only occur when a head is starting to record a track but for television signals this could be repeated more often, e.g. during each line blanking interval.

Figure 8:
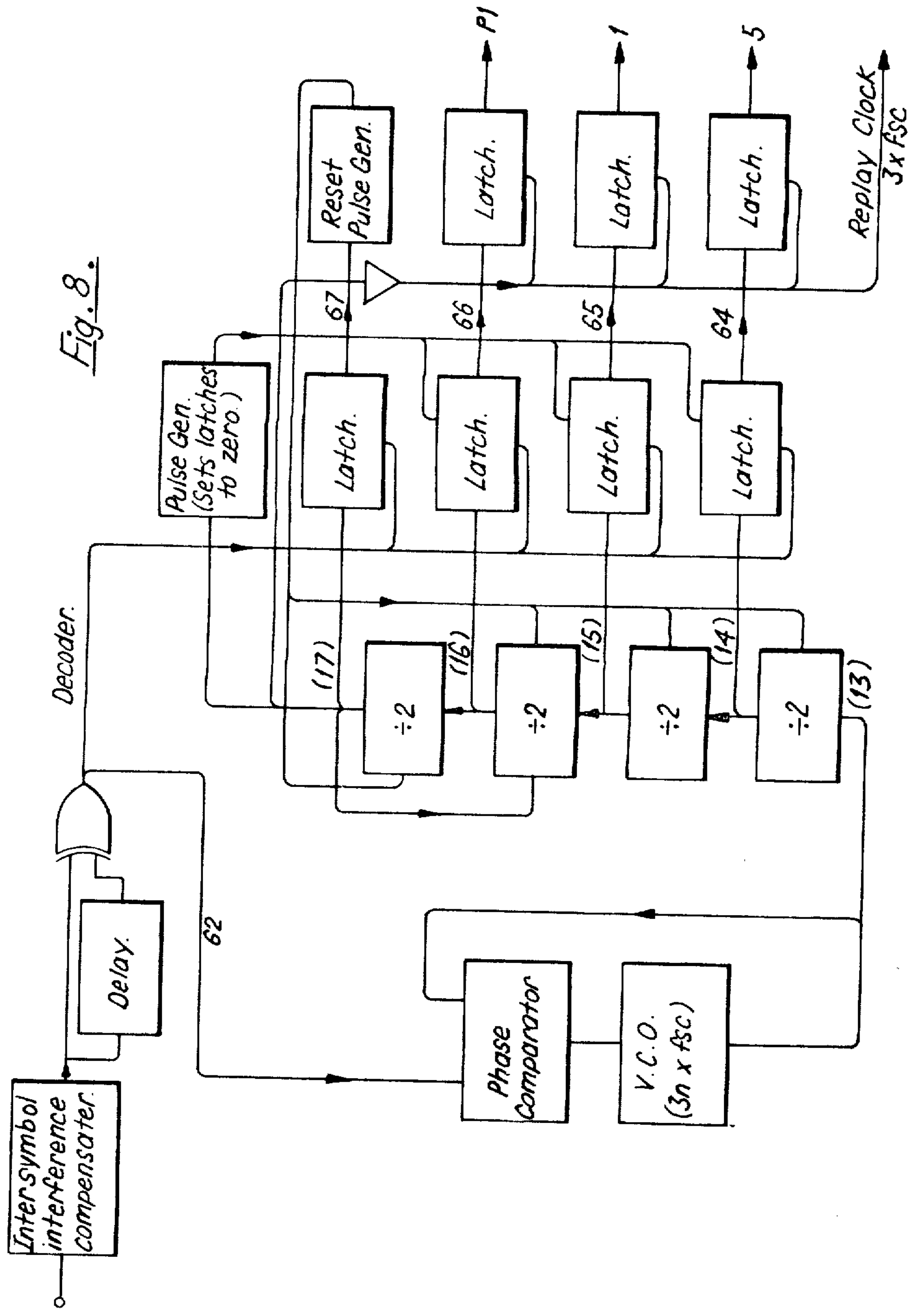
FIG. 8 shows the processing of replayed signals from the tape of FIG. 5.

FIG. 8 shows how the replayed signal coming from each head amplifier is processed. Firstly the signal passes through an Intersymbol Interference Compensator which may comveniently be a transversal equalizer which is arranged to minimize intersymbol crosstalk. The signal from the compensator passes directly to an input of an exclusive-or gate and also via a delay to the other input of the same gate. The output 62 of this gate is a positive pulse of duration equal to the length of the delay line and starts when a transition occurs. These pulses pass to a Phase Comparator controlling the frequency of a Voltage Controlled Oscillator whose output is connected back to the other input of the phase comparator. The output of the Oscillator (13) is counted by a similar counter to that used in the record processing. Near the start of a complete cycle of operation, which lasts for one third of a cycle of sub-carrier, the outputs 66, 65 and 64 of three latches are set to zero. When a transition occurs the gate output pulse 62 causes the four output states of the counter (17), (16), (15) and (14) to be stored and they appear at latch outputs 67, 66, 65 and 64 respectively. At the end of the cycle the information at 66, 65 and 64 is transferred to the outputs of three additional latches to give P1, 1 and 5.

This assumes that the counter is correctly in step. A start sequence having the following three stages will inevitably result in correct synchronisation of the channel carrying P 1, 1 and 5.

| | P1 | 1 | 5 |
|---|---|---|---|
| 1st Stage | High | High | High |
| 2nd Stage | High | Low | Low |
| 3rd Stage | Low | Low | Low |

Figure 9:
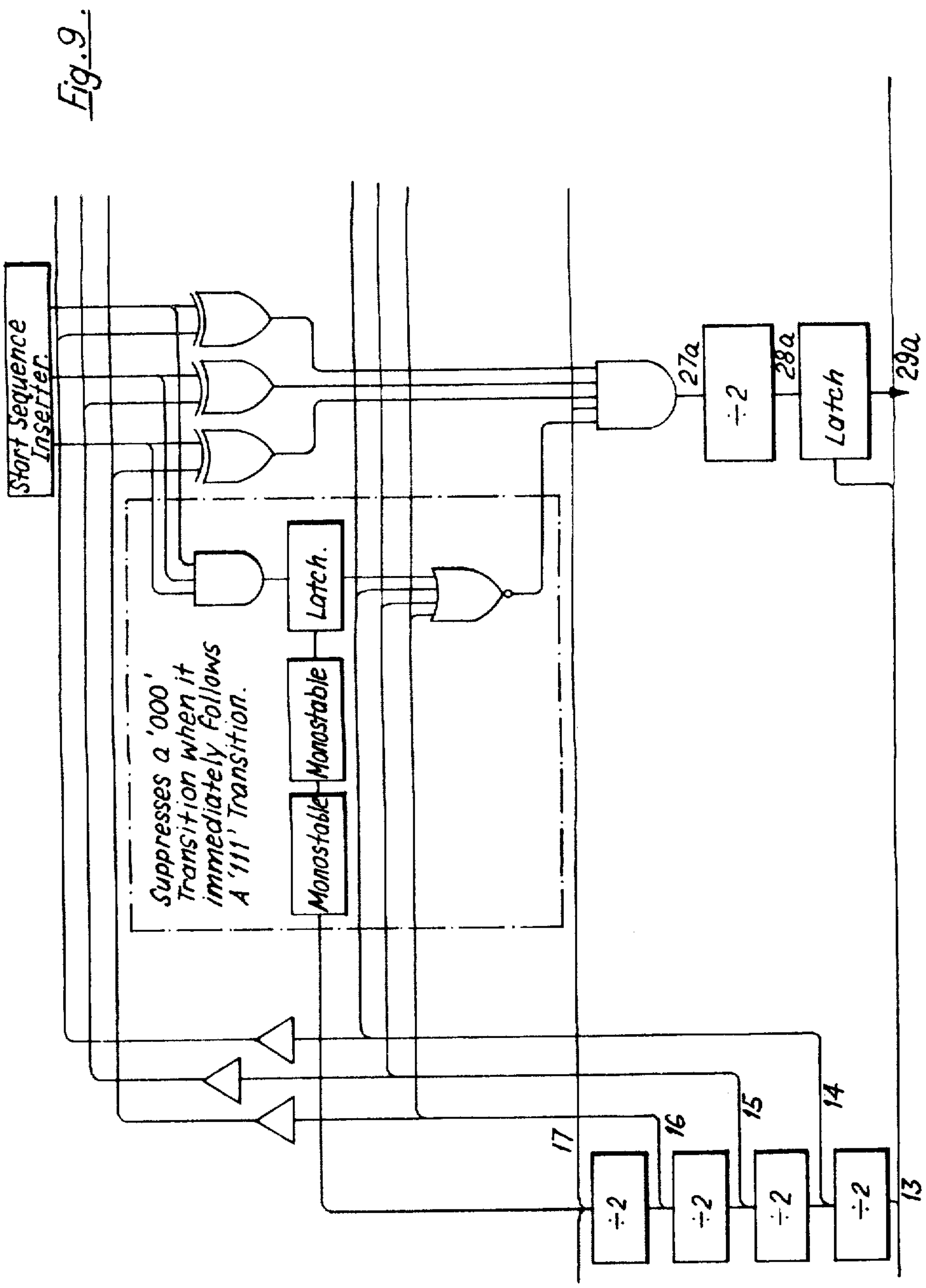
FIG. 9 shows modifications required if one transition (7 to 0) is to be implied.

The same pattern for P 2, 2 and 6; P3, 3 and 7 and P 4, 4 and 8 will likewise ensure synchronisation. The means by which this is achieved is to consider the latch output 67 which should always be positive when correctly synchronised. If it is negative the counters are reset to the all low state. On the third stage of the start sequence this must result in correct synchronisation. Different start sequences have to be used if n is less than 12. FIG. 9 shows the modifications required to the record processing if the 7 to 0 transition is to be implied. If the p 1, 1 and 5 data are all high during one word the output of the And Gate goes high. After the all low state of 16, 15 and 14 but before the end of the word the output of the And Gate is transferred to the input of the Nor Gate. During the succeeding all low state of 16, 15 and 14 the output of the Nor Gate will be low so preventing a transition being generated during that time as shown by 27*a*, 28*a*, 29 *a* compared to 27, 28 and 29.

Figure 10:
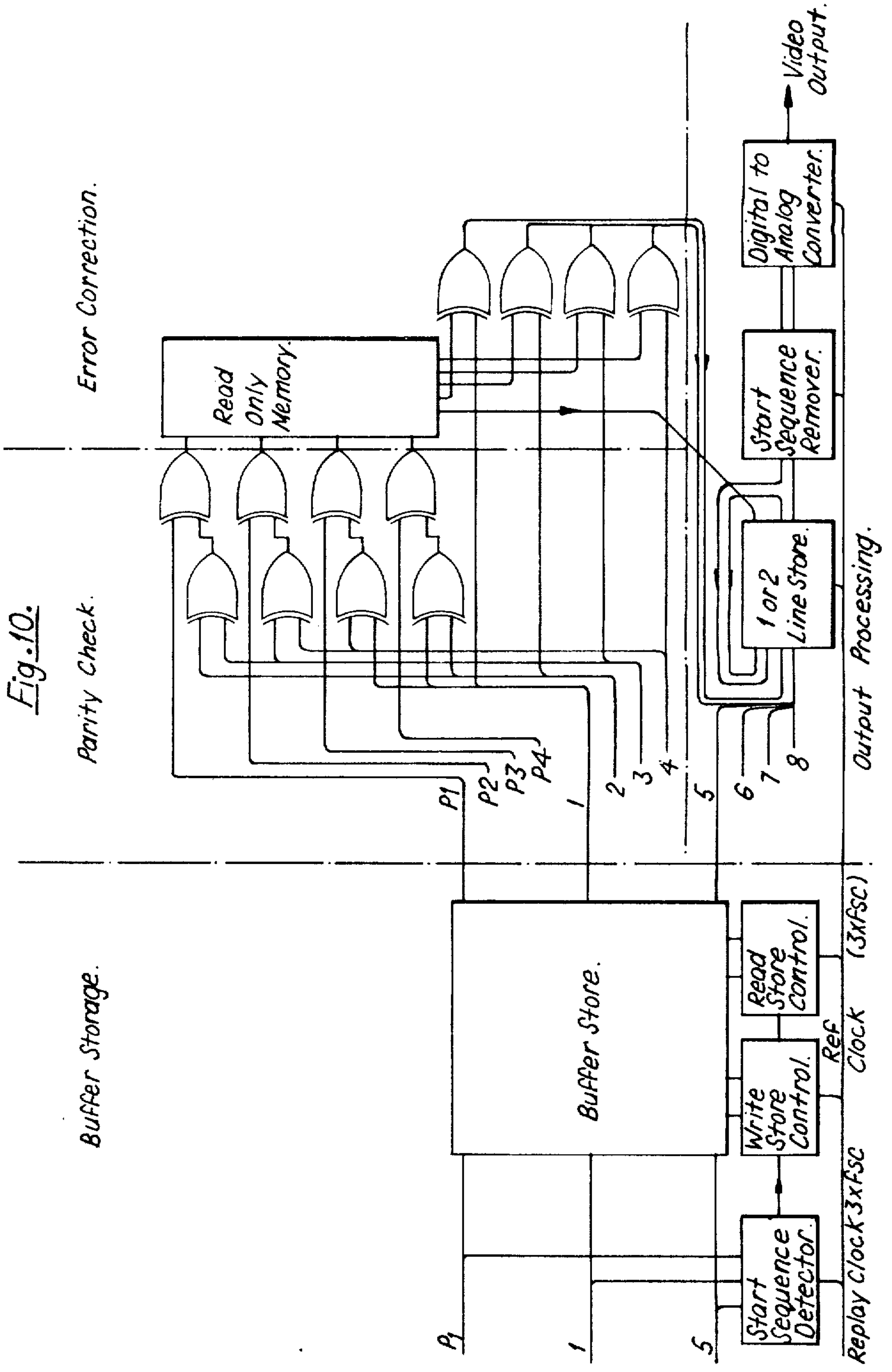
FIG. 10 shows further features of preferred apparatus.

FIG. 10 shows the Buffer Storage, Parity Check, Error Correction and Output Processing. The Start Sequence can be extended so that the probability of normal picture information producing the same sequence can be reduced to insignificant proportions. Alternatively, a sequence such as 7, 4, 0, 2, 7, 4, 0 could be used which will have a nominal zero probability. In either case the chosen start sequence is used to control the writing of P 1, 1 and 5 into a quarter of the Buffer Store, the Replay Clock being used for precise timing. Similar apparatus will control the writing of the other data into the same store.

The information is read from the Buffer Store the precise timing now being determined by the Reference Clock. The parity of the data 1, 2, 3 and 4 is now generated and compared with the parity data P 1, P 2, P 3 and P 4. Normally the outcome of this parity checking will result in four low signals passing to the Read Only Memory. Depending on the type of probable data errors the Read Only Memory can be programmed to identify minor errors such as caused by a drop-out on one channel and to correct them by the use of the exclusive-or gates that bits 1, 2, 3 and 4 are passing through. However, for major errors such as the rare occurrence of simultaneous drop-outs on two or more channels the one or two Line Store goes into recirculation of all bits for the duration of this event so substantially removing the impairment.

It remains only to remove the Start Sequence and to convert back to analog form by a Digital to Analog Converter to obtain a video output signal of the normal analog type for transmission or display.

Figure 11:
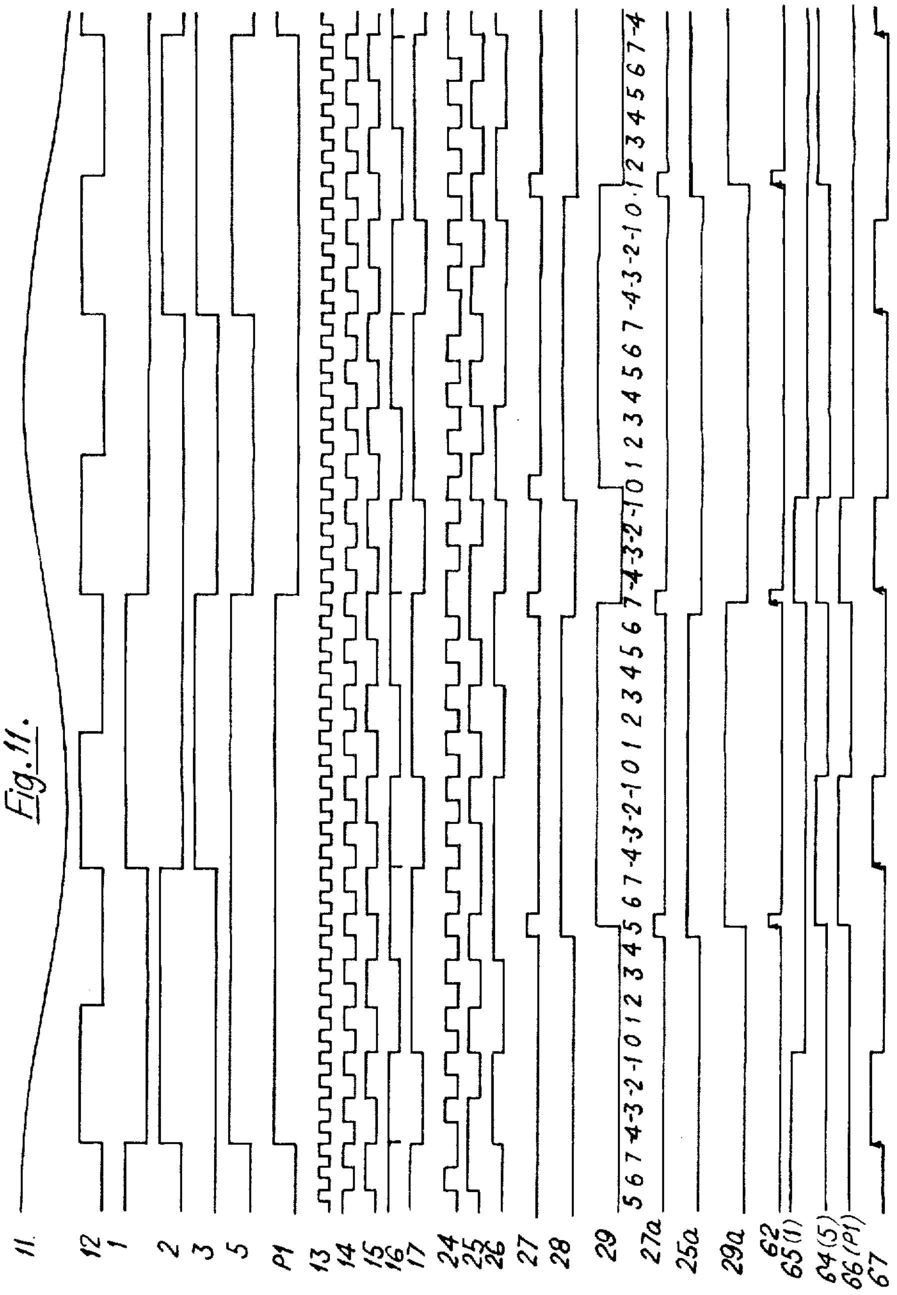
FIG. 11 shows waveforms at various numbered points of the apparatus of the preceding drawings.

FIG. 11 shows waveforms at correspondingly numbered positions in the equipment.

In FIG. 5, the tape is shown as viewed from the centre of rotation of the heads and the widths of the tracks and guard bands therebetween are exaggerated in the interests of clarity. Tape already transversed by the heads is shown shaded and tape about to be traversed is shown unshaded. Arrows X show the plane of the heads, arrow Y shows the direction of travel of the tape and arrow Z shows the direction of movement of the heads.

FIG. 12 shows an example of a mechanical arrangement suitable for the five heads. The heads A to E are mounted 72° apart upon a rotary head-disc so that they just project through a circumferential slot in a stationary cylindrical drum. The tape traverses the major part of the external surface of the drum, being guided by frusto-conical stationary guide members so that it is moved in the direction of the rotational axis of the head-disc during its circumferential traverse.

It will be understood that parity signals may be derived by any convenient logical processing of the signals to be checked. The parity signal may be any algebraic or other function of the signals.

I claim:

1. Apparatus for converting an original input signal of the kind which has a limited set of possible discrete values which comprises an input for said signal, apparatus for generating a cyclic reference signal providing in each cycle a set of values corresponding with the possible values of the input signal and at least one additional value, and a comparator responsive to produce a comparator output when the value of the reference signal corresponds with the value of the input signal, so that comparator outputs are obtained whose relationship to the phase of the reference signal represents the value of the original input signal.

2. Apparatus according to claim 1 for use with binary digital input signals, said apparatus having means for generating a reference signal whose cycle comprises three values.

3. Apparatus according to claim 1 having means for omitting outputs corresponding with pre-determined changes of the value of the input signal.

4. Apparatus for converting an original input signal of the kind which has a limited set of possible discrete values which comprises an input for said signal, apparatus for generating a cyclic reference signal providing in each cycle a set of values corresponding with the possible values of the input signal and at least one additional value, a comparator responsive to produce a comparator output when the value of the reference signal corresponds with the value of the input signal, so that comparator outputs are obtained whose relationship to the phase of the reference signal represents the value of the original input signal, and a binary output circuit giving two output levels and being reversible, on receipt of a comparator output, to change from giving one of said two output levels to give the other of said two output levels so that the timing of a change from one of said two output levels to the other of said two output levels represents the value of the original input signal.

5. Apparatus for the recovery of original input signals having a limited number of possible discrete values from received signals derived by comparing said original input signals with a cyclic reference signal providing in each cycle a set of values corresponding with the possible values of the original input signals and at least one additional value so that outputs are obtained whose relationship to the phase of the reference signal represents the value of the original input signal but omitting outputs corresponding with predetermined changes of the value of the original input signal, said apparatus having means for inserting signals corresponding with said predetermined changes in the absence of other signals, means adapted to regenerate the cyclic reference signal and a regenerating device operable to sample the values of the regenerated reference signal at times governed by the received signals.

6. Apparatus for recovering an original input signal having a limited set of possible discrete values from received signals of the kind represented by comparator outputs whose relationships to the phase of a cyclic reference signal, providing in each cycle a set of values corresponding with the possible values of the input signal and at least one additional value, represent the values of the original input signal, which apparatus comprises means adapted to regenerate the cyclic reference signal, and a regenerating device operable to sample the values of the reference signal at times governed by the received signals.

7. Apparatus according to claim 6 in which the means adapated to regenerate the cyclic reference signal is responsive for synchronization to the received signals.

* * * * *